United States Patent [19]

Ilic et al.

[11] Patent Number: 5,158,722
[45] Date of Patent: Oct. 27, 1992

[54] PROCESS FOR THE PRODUCTION OF A POSITIVE ELECTRODE IN RIBBON FORM FOR PRIMARY AND SECONDARY CELLS

[75] Inventors: Dejan Ilic, Rosenberg; Hans Sauer, Idstein-Walsdorf; Dirk Neumann, Aalen, all of Fed. Rep. of Germany

[73] Assignee: Varta Batterie Aktiengesellschaft, Hanover, Fed. Rep. of Germany

[21] Appl. No.: 696,368

[22] Filed: May 6, 1991

[30] Foreign Application Priority Data

May 12, 1990 [DE] Fed. Rep. of Germany ....... 4015363

[51] Int. Cl.$^5$ .............................................. B29C 43/28
[52] U.S. Cl. .................... 264/40.1; 264/104; 264/105; 264/113; 429/217
[58] Field of Search .............. 264/104, 105, 113, 40.1; 429/209, 220, 221, 224, 217

[56] References Cited

U.S. PATENT DOCUMENTS

| | | | |
|---|---|---|---|
| 2,678,343 | 5/1954 | Daniel | 264/104 |
| 4,216,045 | 8/1980 | Morioka | 264/104 |
| 4,710,335 | 12/1987 | Kita et al. | 264/105 |
| 4,790,969 | 12/1988 | Bailey | 264/105 |
| 4,902,589 | 2/1990 | Dahn | 429/94 |

Primary Examiner—Mary Lynn Theisen
Attorney, Agent, or Firm—Weiser & Stapler

[57] ABSTRACT

Positive ribbon electrodes for primary and secondary cells are produced in a dry process wherein two strips of active material in powder form, preferably comprised of $MnO_2$, $FeS_2$, $CuO$, $\alpha\text{-}Cu_2V_2O_7$, and $Li_xMnO_y$, are simultaneously rolled and then fed into the gap of a roller mechanism, on opposite sides of an interposed metal net or mesh, to roll coat both sides of the lattice-like carrier strip. After excess mass is stripped off, the finished electrode ribbon has a thickness of less than 0.45 mm and a porosity of more than 24% which, because of its large active surface, is advantageously used in wound batteries incorporating Li or $H_2$ electrodes.

12 Claims, 1 Drawing Sheet

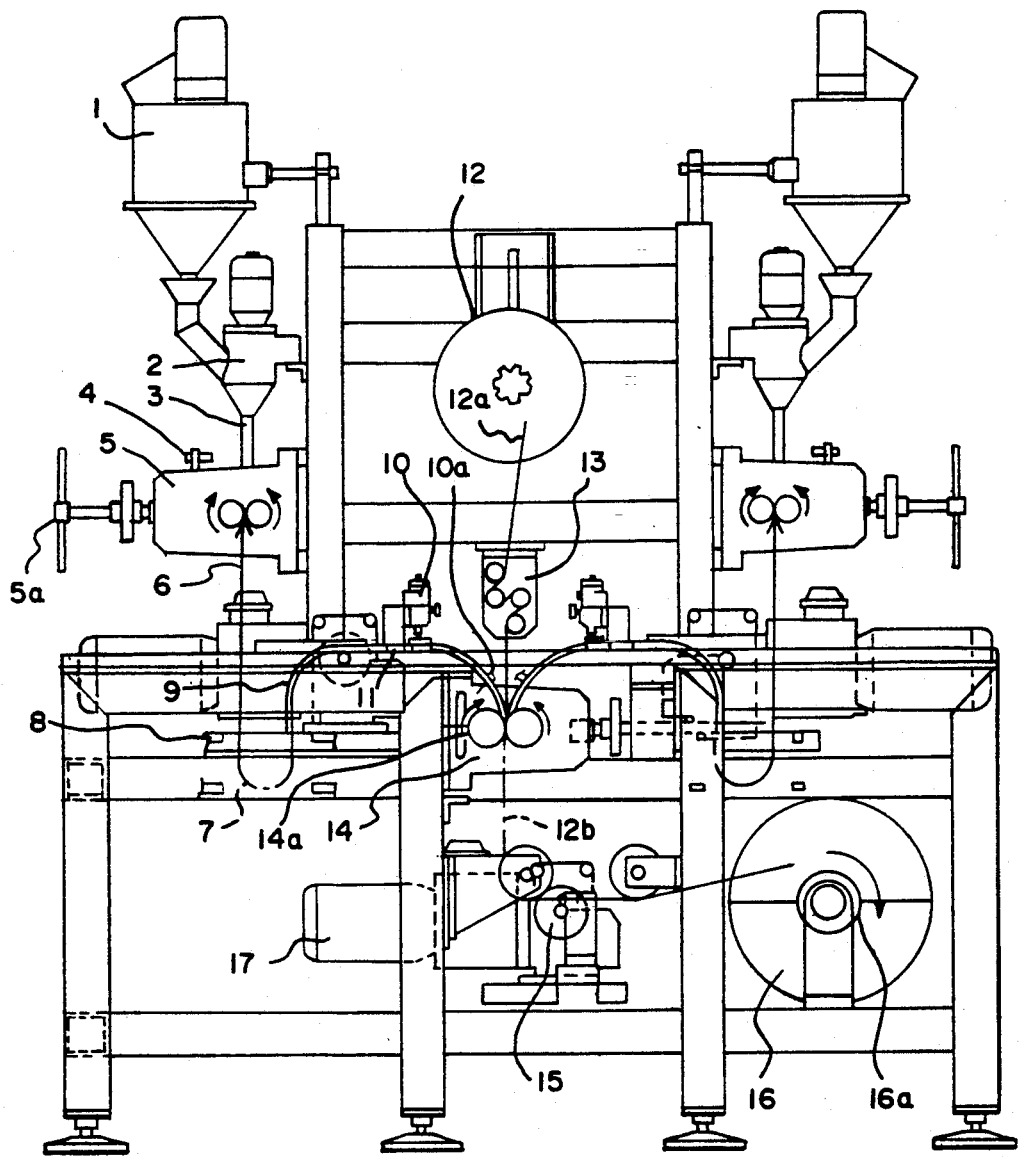

PROCESS FOR THE PRODUCTION OF A POSITIVE ELECTRODE IN RIBBON FORM FOR PRIMARY AND SECONDARY CELLS

BACKGROUND OF THE INVENTION

This invention pertains to a process and apparatus for the production of a positive electrode in the form of a ribbon, for primary and secondary cells, and more particularly, to the production of a positive electrode formed by rolling a dry powder mixture of an electrochemically active material and a binder onto a metal net or metal mesh, which serves as the current collector.

Such positive electrodes find particular utility in wound batteries with liquid electrolytes based on systems with Li electrodes or $H_2$ electrodes as the negative (counter) electrode, extending to both nonaqueous and aqueous systems. In such cases, the counter-electrodes are often rolled helically, together with the positive electrode and an interleaved separator.

Such winding requires, above all, high flexibility of the ribbon-like or foil-like electrode materials. The usual practice is to wind such electrodes in a wet process, e.g., by painting both sides of a perforated metal web with a metal oxide paste, as disclosed in DE-OS 2 903 074. In practice, production of the wound electrode body commences with preparation of the paste, and the maintenance of a suitable viscosity, and ends with a careful drying process in which the formation of cracks in the adhering mass layers must be avoided. Such processing requires considerable technical effort.

DE-PS 1 496 289 discloses a dry process in which the powdered active material is continuously forced between forming rolls, into the lattice of a metal mesh (the carrier net). In such case, the interstices of the mesh are filled in the zone of compression developed between the rolls, from one side. However, this disclosure gives only an approximate reference to the final thickness of the resulting electrode ribbon, stating that the carrier net has an initial thickness of 0.5 to 2.5 mm and is compressed (by rolling) to preferably 25% of its original thickness.

SUMMARY OF THE INVENTION

It is therefore the principal objective of the present invention to provide a process and an apparatus for producing positive ribbon electrodes for wound batteries which exhibit improved utilization of materials and which are especially suited to lithium systems.

This and other objects which will be apparent are achieved in accordance with the present invention by providing a process and an apparatus for producing a positive electrode in the form of a ribbon, for primary and secondary cells, in which a dry powder mixture of the electrochemically active material and a binder is introduced by rollers into a metal net or metal mesh, which serves as the current collector, from opposite sides. To this end, two strips of the dry powder mixture are simultaneously fed (rolled out) from opposite sides of the gap developed between the rollers while a lattice or net-like current collector enters between the rollers and is coated on both sides with the material forming the mass strips, filling the interstices of the metal mesh. Following this, excess material is stripped from the finished electrode ribbon, which is then wound up for storage.

As a result, the lattice-like current collector (which may be a metal net or a metal mesh) is coated on both sides with the active material, in a dry rolling process. Starting with a dry powder mixture comprised of the electrochemically active material and a smaller proportion of binder, the material is applied to the carrier as desired, but not directly (as with prior techniques). Rather, in accordance with the present invention, the current collector (ribbon) is coated on both sides in a roll coating process making use of mass ribbons which have been separately (previously) fabricated of the dry powder mixture.

For further detail regarding the process and apparatus of the present invention, reference is made to the description which is provided below, taken in conjunction with a single illustration of an apparatus for implementing the process of the present invention.

DETAILED DESCRIPTION OF THE INVENTION

Referring to the drawing, the illustrated rolling installation includes two powder feeds 1 for simultaneously producing two mass foils. The powder feeds take the form of a filler funnel through which the desired mass is fed, as needed, to a hammer mill 2. The discharged powder is then introduced into a feed channel 3. The level of the powder in the feed channel 3 is measured by a photolimiter 4 which serves as a measure of, and a regulation parameter for, consumption of the powder mixture. This, in turn, is fed back to a metering device within the filler funnel (e.g., an agitator, not shown).

Each hammer mill 2, if necessary, pulverizes any lumps formed during production of the mass and feeds the powder, via the feed channel 3, to a rolling mill 5. In the rolling mill 5 the powder is compressed and rolled into a solid strip 6 of material, or into a foil. Ribbons or foils with different thicknesses can be produced by using (substituting) rolls with different diameters. For correction of this thickness, in limited range, a fine adjustment 5a is provided on the rolling mill 5.

The rolled mass strip 6 is then fed (from both sides) through a slide rail 9 with edge guidance 10, 10a, to a roller frame 14. Since the feed of the mass strip 6 does not have to be synchronous at all times, the drive gears (not shown) are individually governed by photolimiters 8 responsive to the length of a belt equalizer loop 7 formed in feeding the mass strip 6 to the roller frame 14.

The associated current collector 12a (made of a net-like carrier ribbon and/or a metal mesh) is pulled from a spool 12 located on the roller frame 14, and through braking, turning and guide rolls 13, for delivery between the rolls 14a of the roller frame 14 together with the mass strips 6, which are then positioned on either side of the current collector 12a. As a result, the current collector 12a is coated on both sides with the strips 6 (mass ribbons or foils) of material, as desired.

Excess material is then removed with a stripper 15, and the resulting electrode tape 12b is preferably wound onto a driven spool 16 for storage. The tensile force of the driven spool 16 is preferably matched to feed of the electrode material by a slip clutch 16a in order to suppress damage. A collecting plate and suction system (not shown) is preferably positioned above the spool 16 to prevent damage to the electrode by falling particles of material. The electrode tape 12b wound onto the spool 16 can then be removed from the apparatus as a coil, so that the cathode form can be stamped from the electrode ribbon 12b and subjected to a heat treatment, if necessary, readying the cathode form for winding.

Electrodes produced in this manner impart a relatively high weight-related energy content and a high energy density per volume to the batteries which incorporate them. What is more, such batteries (e.g., size AA) may be used for different discharge current densities. For pulsed discharge operation, if one selects a discharge-time to pause-time ratio of 1:2, then the batteries can be charged with up to 1.5 A. Even in the case of a long term charge of 100 mA, the preassigned energy density for such batteries drops by only 20%.

The electrode ribbons produced according to the present invention are formed of a thickness which reaches a maximum of 2.0 mm, but which is preferably only 0.40 to 0.20 mm. Nevertheless, such electrode ribbons have a greater active surface in comparison to electrode ribbons which have been coated on only one side. At the same time, porosity values at least 24%, and preferably of 28 to 30%, are achieved. Such rolled electrodes are especially advantageously combined with negative counter electrodes such as Li and $H_2$, and can be used in primary and secondary systems.

Preferred active materials for producing electrodes in accordance with the present invention include $MnO_2$, $FeS_2$, $CuO$, $\alpha$-$Cu_2V_2O_7$, or $Li_xMnO_y$ where $1.5 < ; x < 2$ and $2.5 < y < 3$. However, oxides of manganese, iron, copper and vanadium, as well as sulfides of molybdenum, titanium and vanadium, can also be considered for use. What is more, positive active materials useful in conventional alkaline batteries, such as $Ni(OH)_2$, $Fe(OH)_2$, $Co(OH)_2$ or $Zn(OH)_2$, can be fabricated into electrodes making use of the process and apparatus of the present invention. Advantageous use of this technique is also possible for nickel-hydrogen storage batteries. To be noted is that in addition to the active material, the dry powder mixture may also contain the usual small quantities of PTFE as a binder, as well as a little carbon black, as is conventional.

The following provides some examples of lithium wound batteries (size AA) equipped with positive rolled electrodes produced in accordance with the present invention, and then subjected to a discharge test. A solution of $LiClO_4$ in a propylene carbonate-dimethoxyethane mixture was in each case used as the electrolyte.

EXAMPLE 1

A cathode ribbon was produced by rolling a dry powder mixture of $MnO_2$ with 10% PTFE and carbon black onto both sides of a net-like current collector. The thickness of the ribbon was 0.40 mm, with a porosity of 33% and a BET surface of 20 $m^2/g$.

Following a pulsed discharge with a 3 second discharging time at 1.3 A and a 7 second pause time, the resulting lithium battery achieved a specific capacity of 197 mAh/g of cathode mass. A comparable lithium battery having a cathode coated on only one side (the conventional rolling technique) and having a similar thickness of 0.45 mm, exhibited a specific capacity of only 180 mAh/g cathode mass.

EXAMPLE 2

A cathode ribbon identical to the cathode ribbon of Example 1 was rolled to a thickness of 0.30 mm using rolls of a smaller diameter and a narrower gap. Resulting stretching of the electrode ribbon caused an enlargement of the geometric electrode surface of 20%.

A lithium wound battery constructed with this cathode was successfully discharged, even with 1.5 A in pulsed operation, with a specific capacity which was 5% higher than that of the 0.40 mm thick electrode.

This shows that as a result of thickness reduction of the bilaterally coated rolled electrode of the present invention, the charging capacity of the battery increases. This is due to an increased cathode area with the same active mass. The porosity and the BET surface were also measured, at 31% and 19 $m^2/g$, respectively. Compared with the numerical values of Example 1, it is seen that scarcely any change resulted from such thickness reduction.

EXAMPLE 3

Remaining tests showed that the rolled electrode structure of the present invention is advantageously applied not only to the production of cathodes in wound batteries of the $Li/MnO_2$ primary system, but also to the production of cathodes of the primary systems $LiFeS_2$ or $Li/CuO$, as well as the secondary systems $Li/Cu_2V_2O_7$ or $Li/Li_xMnO_y$. In these cases, wound batteries with cathode ribbons rolled in accordance with the present invention were tested only with a continuous discharge current of 1.3 A/battery (current density = 1 $mA/cm^2$).

For the sake of clarity, the following specific current efficiencies were achieved, as expressed in Example 1, by the capacity values per 1 g of cathode mass and the thicknesses (d) of the electrode.

$FeS_2$: 295 mAh/g; d = 0.30 mm
$CuO$: 278 mAh/g; d = 0.37 mm

The BET surface of the $FeS_2$ electrode, at 20 $m^2/g$, corresponded to that of the 0.40 mm thick $MnO_2$ electrode from Example 1, with a porosity of 24.2%.

A thickness reduction (d < 0.30 mm) is necessary in the production of cathode ribbons of $\alpha$-$Cu_2V_2O_7$ or $Li_xMnO_y$ for secondary systems. Only in this way is it possible to obtain higher specific capacity values, between 230 and 200 mAh/g of active mass, and a higher charging capacity of the battery. With the $Li/Li_xMnO_y$ secondary battery, about 100 cycles were achieved. However, the cycle life expectancy for such batteries was not exhausted since, in this test, the lithium electrode was capacity-limiting in subsequent cycles.

It will therefore be understood that various changes in the details, materials and arrangement of parts which have been herein described and illustrated in order to explain the nature of this invention may be made by those skilled in the art within the principle and scope of the invention as expressed in the following claims.

What is claimed is:

1. A process for producing a positive electrode in the form of a ribbon for primary and secondary cells, comprising the steps of:
   simultaneously rolling two strips of a dry powder mixture of an electrochemically active material and a binder;
   introducing a current collector formed of a metal net or mesh, and the strips, into a gap defined by a pair of rollers so that the current collector enters between the rollers with the strips positioned on opposite sides thereof; and
   compressing the strips against the current collector, coating both sides of the current collector with the dry powder mixture of the strips and filling interstices of the metal net or mesh.

2. The process of claim 1 which further comprises the step of stripping excess material from the coated electrode ribbon.

3. The process of claim 2 which further comprises the step of winding the coated electrode ribbon for storage.

4. The process of claim 1 wherein the electrode ribbon is rolled to a final thickness of at most 2.0 mm.

5. The process of claim 4 wherein the final thickness is from about 0.2 to about 0.4 mm.

6. The process of claim 4 wherein the electrode ribbon has a porosity of at least 24%.

7. The process of claim 6 wherein the porosity is from about 28 to about 30%.

8. The process of claim 1 wherein the electrochemically active material of the electrode is selected from the group consisting of $MnO_2$, $FeS_2$ or $CuO$.

9. The process of claim 1 wherein the electrochemically active material of the electrode is $\alpha$-$Cu_2V_2O_7$ or $Li_xMnO_y$ wherein $1.5 < x < 2$ and $2.5 < y < 3$.

10. The process of claim 1 which further comprises the step of regulating the final thickness of the electrode.

11. The process of claim 10 wherein said regulating includes the step of measuring and metering the dry powder mixture before the strips are rolled.

12. The process of claim 10 wherein said regulating includes the step of adjusting the gap defined by the pair of rollers.

* * * * *